(12) United States Patent
Lu

(10) Patent No.: US 7,316,387 B2
(45) Date of Patent: Jan. 8, 2008

(54) EXTENSIBLE SUPPORTING STRUT

(75) Inventor: Jung Wen Lu, Taichung (TW)

(73) Assignee: Ratchet Co., Ltd., Taichung County (TW)

( * ) Notice: Subject to any disclaimer, the term of this patent is extended or adjusted under 35 U.S.C. 154(b) by 113 days.

(21) Appl. No.: 11/062,843

(22) Filed: Feb. 23, 2005

(65) Prior Publication Data

US 2006/0186387 A1   Aug. 24, 2006

(51) Int. Cl.
*B66F 1/04* (2006.01)

(52) U.S. Cl. .................................................... 254/108

(58) Field of Classification Search ......... 254/108–111
See application file for complete search history.

(56) References Cited

U.S. PATENT DOCUMENTS 4,434,970 A * 3/1984 Boland et al. .............. 254/108

* cited by examiner

Primary Examiner—Robert C. Watson
(74) Attorney, Agent, or Firm—Rosenberg, Klein & Lee

(57) ABSTRACT

An extensible supporting strut including an inner sleeve and an outer sleeve. Each end of the supporting strut has a supporting section. The inner sleeve is formed with several engaging holes axially arranged at equal intervals. A base seat is connected between the outer sleeve and the inner sleeve. Two locking lugs laterally extend from the bottom of the base seat for locking the outer sleeve. The base seat has two symmetrically extending sideboards each having a head section. An engaging member and a handle are pivotally disposed between the head sections of the sideboards. A pivoted end of the handle is formed with a stepped protruding push section. The engaging member is pivotally disposed in the handle and has a pivoted end formed with a toothed section. The middle sections of the sideboards are formed with a pair of aligned through holes. A fixing pin is passed through the through holes, a resilient member and a pawl. By means of the resilient force of the resilient member, the pawl is inserted into the engaging hole of the inner sleeve.

3 Claims, 10 Drawing Sheets

EXTENSIBLE SUPPORTING STRUT

BACKGROUND OF THE INVENTION

The present invention is related to an extensible supporting strut which serves to longitudinally and transversely support an article. The extensible supporting strut is designed with security effect.

FIGS. 9 and 10 show a conventional extensible supporting strut 6 composed of an inner sleeve 61 and an outer sleeve 62. Each end of the supporting strut 6 has a supporting section 63. A base seat 7 having an opening is connected between the outer sleeve 62 and the inner sleeve 61. Two locking lugs 71 laterally extend from the bottom of the base seat 7 for locking the outer sleeve 62. The base seat 7 has two sideboards 72. A fixing pin 73 is passed through the sideboards 72, a ratchet wheel 74 and a handle 75. The handle 75 has a head section having lugs. An abutting member 76 is disposed in the handle 75 for abutting against the ratchet wheel 74. In normal state, the ratchet of the ratchet wheel 74 is engaged in an adjustment hole 611 of the inner sleeve 61. By means of adjusting the abutting member 76, the ratchet wheel 74 can be driven to change the length of the inner sleeve 61. A dog 77 is disposed between the sideboards 72 for preventing the ratchet wheel 74 from rotating so as to fix the inner sleeve 61.

In use of the extensible support strut 6, by means of turning the handle 75, the ratchet wheel 74 is rotated. The abutting member 76 abuts against the ratchet of the ratchet wheel 74, whereby the inner sleeve 61 can extend outward by means of the engagement between the ratchet and the adjustment hole 611. Accordingly, the supporting sections 63 at two ends of the supporting strut 6 can firmly support an article. When it is desired to quickly extend out or retract in the inner sleeve 61, the handle 75 is turned upward. At this time, the lugs 751 of the head section of the handle 75 push the dog 77 to disengage from the ratchet wheel 74. Under such circumstance, the inner sleeve 61 can be freely quickly telescoped into the outer sleeve 62 without any buffering resistance. In the case that the supporting strut 6 is used in an upright state, the inner sleeve 61 will drop due to its own weight. A user can hardly react in time. As a result, the user tends to be hit or injured by the supporting section 63. Moreover, in the instant of losing the support, the supported article may drop or collapse.

Therefore, it is tried by the applicant to provide an extensible supporting strut with buffering and slipproof effect so as to avoid quick retraction and injury of a user.

SUMMARY OF THE INVENTION

It is therefore a primary object of the present invention to provide an extensible supporting strut. A resilient member and a pawl are disposed under a handle. Two ends of the resilient member respectively abut against rear section of the pawl and an inner sleeve. By means of the resilient force of the resilient member, the claw of the pawl is inserted into the engaging hole of the inner sleeve. The pawl is pivotally disposed between two sideboards of a base seat. When retracting the inner sleeve of the supporting strut, the pawl provides a buffering and security effect.

According to the above object, the extensible supporting strut of the present invention includes an inner sleeve and an outer sleeve. Each end of the supporting strut has a supporting section. The inner sleeve is formed with several engaging holes axially arranged at equal intervals. A base seat is connected between the outer sleeve and the inner sleeve. The base seat has two symmetrically extending sideboards each having a head section. An engaging member and a handle are pivotally disposed between the head sections of the sideboards. A pivoted end of the handle is formed with a stepped protruding push section. The engaging member is pivotally disposed in the handle. The engaging member has a pivoted end formed with a toothed section and a slot. A rear section of the engaging member has a protruding abutting section. A spring is fitted on the abutting section for abutting against inner side of the handle. A middle section of the engaging member has two chucking sections which extend out of the handle. The middle sections of the sideboards are formed with a pair of aligned through holes. A fixing pin is passed through the through holes, a resilient member and a pawl. By means of the resilient force of the resilient member, a claw of the pawl is inserted into the engaging hole of the inner sleeve. Two sides of the claw are formed with two shoulder sections which can be pushed by the push section of the handle.

The present invention can be best understood through the following description and accompanying drawings wherein:

DETAILED DESCRIPTION OF THE PREFERRED EMBODIMENT

Figure 1:
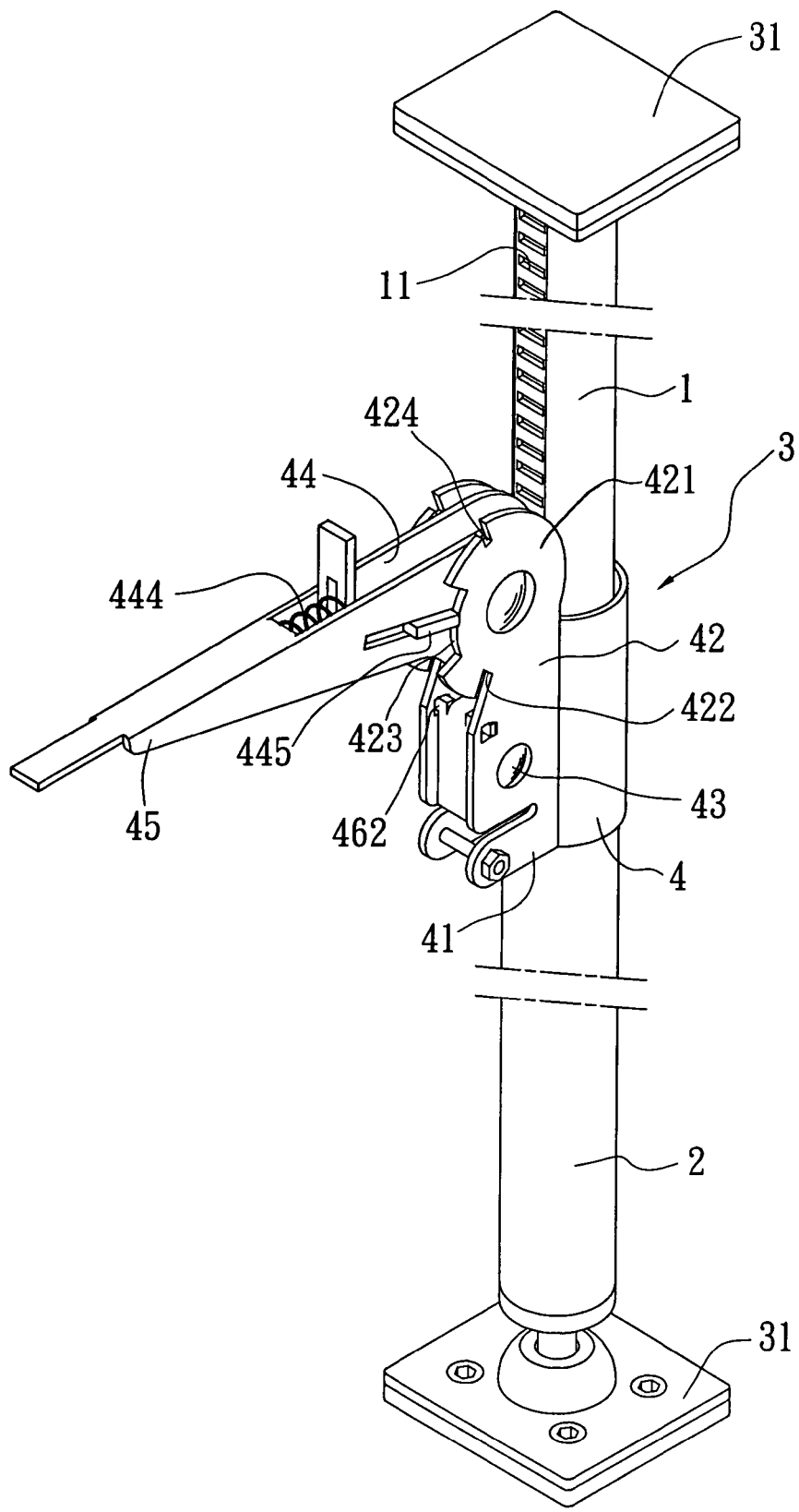
FIG. 1 is a perspective view of the present invention.

Please refer to FIGS. 1 to 8. The extensible supporting strut 3 of the present invention includes an inner sleeve 1 and an outer sleeve 2. Each end of the supporting strut 3 has a supporting section 31. The inner sleeve 1 is formed with several engaging holes 11 axially arranged at equal intervals. A base seat 4 is connected between the outer sleeve 2 and the inner sleeve 1. Two locking lugs 41 laterally extend from the bottom of the base seat 4 for locking the outer sleeve 2. The base seat 4 has two symmetrically extending sideboards 42 each having a head section 421. The head section 421 is sequentially formed with a first engaging split 422, a second engaging split 423 and a third engaging split 424. An engaging member 44 and a handle 45 are pivotally disposed between the head sections 421 of the sideboards 42. A pivoted end of the handle 45 is formed with a stepped protruding push section 451. The engaging member 44 is pivotally disposed in the handle 45. In this embodiment, the engaging member 44 has a front end formed with a toothed section 441 and a slot 442. A rear section of the engaging member 44 has a protruding abutting section 443. A spring 444 is fitted on the abutting section 443 for abutting against inner side of the handle 45.

A middle section of the engaging member 44 has two chucking sections 445 which extend out of the handle 45. The chucking sections 445 can be chucked in the engaging splits 422, 423, 424 of the head sections 421 of the base seat 4. The middle sections of the sideboards 42 are formed with a pair of aligned through holes 426. A fixing pin 43 is sequentially passed through the through holes 426, a resilient member and a pawl 46. In this embodiment, the resilient member is a torque spring 5. Two ends of the torque spring 5 respectively abut against rear section of the pawl 46 and the inner sleeve 1, whereby the claw 461 of the pawl 46 is inserted into the engaging hole 11 of the inner sleeve 1. Two sides of the claw 461 are formed with two shoulder sections 462 which can be pushed by the push section 451 of the handle 45.

Figure 2:
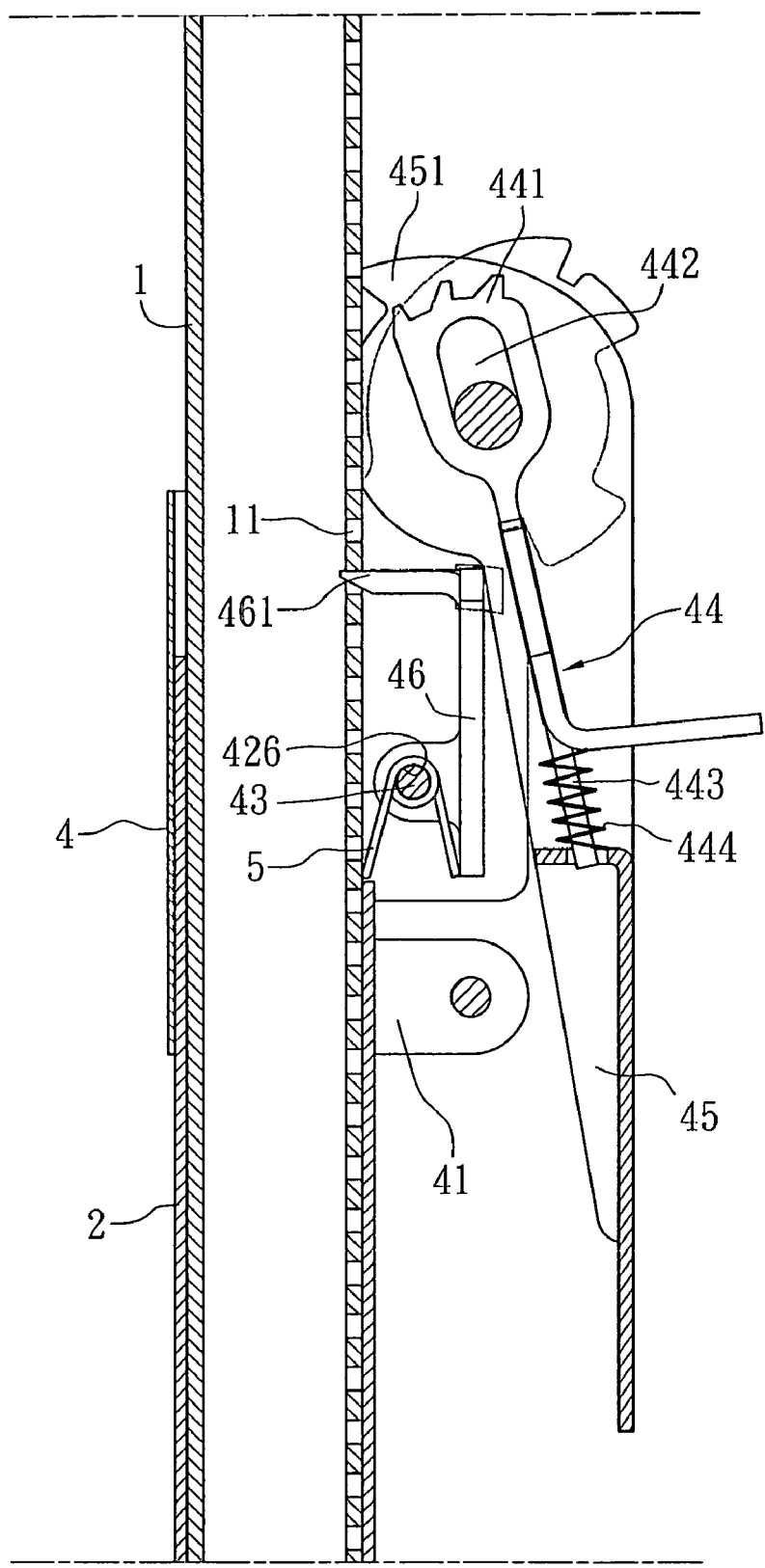
FIG. 2 is a sectional view of the present invention, showing the location relationship between the inner sleeve and outer sleeve of the present invention in normal state.

Referring to FIG. 2, in normal state, the engaging member 44 is forced by the spring 444, whereby the chucking sections 445 of the engaging member 44 are chucked in the first engaging splits 422 of the base seat 4. Also, due to the resilient force of the torque spring 5, the front end of the claw 461 of the pawl 46 is inserted into the engaging hole 11 of the inner sleeve 1 to prevent the inner sleeve 1 from slipping down.

Figure 3:
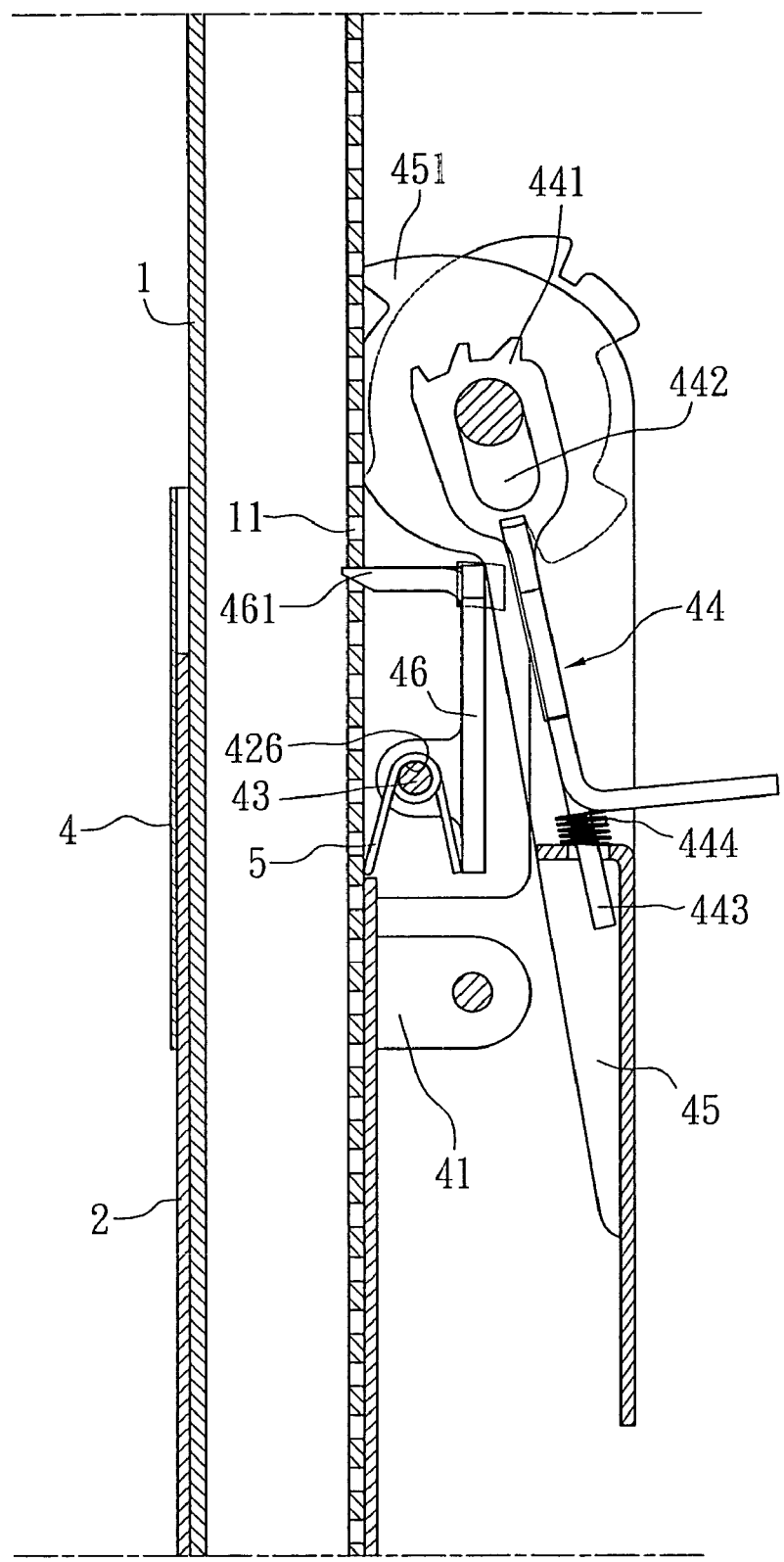
FIG. 3 is a sectional view according to FIG. 2, showing the extension of the inner sleeve of the present invention in a first state.
Figure 4:
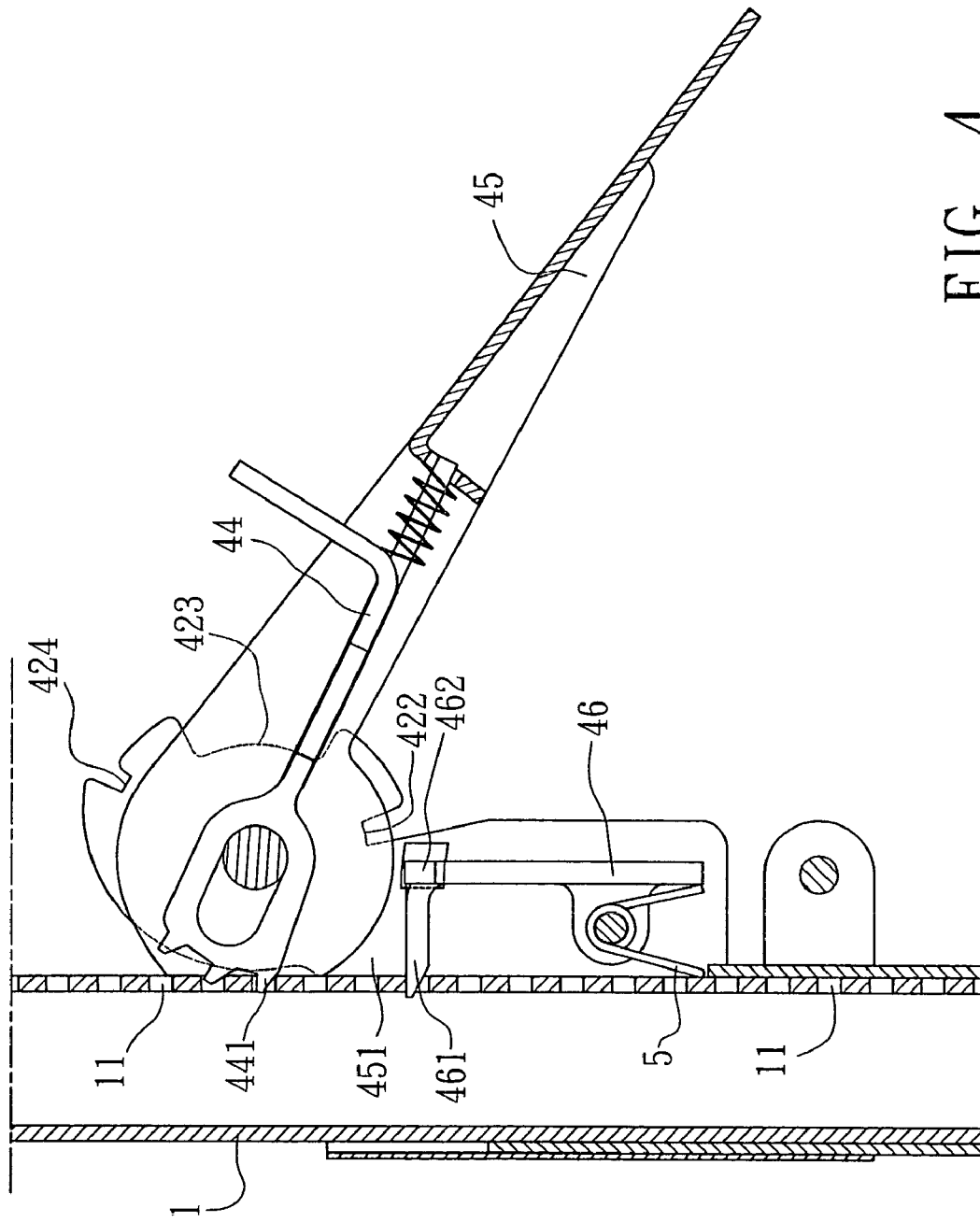
FIG. 4 is a sectional view according to FIG. 2, showing the extension of the inner sleeve of the present invention in a second state.

When extending the inner sleeve 1, the engaging member 44 is pushed as shown in FIG. 3, whereby the chucking section 445 of the engaging member 44 is extracted out of the first engaging split 422 of the base seat 4. Then the handle 45 is turned to move the engaging member 44 into the second engaging split 423. At the same time, the toothed section 441 of the engaging member 44 is right engaged in the engaging hole 11 of the inner sleeve 1 as shown in FIG. 4.

Figure 5:
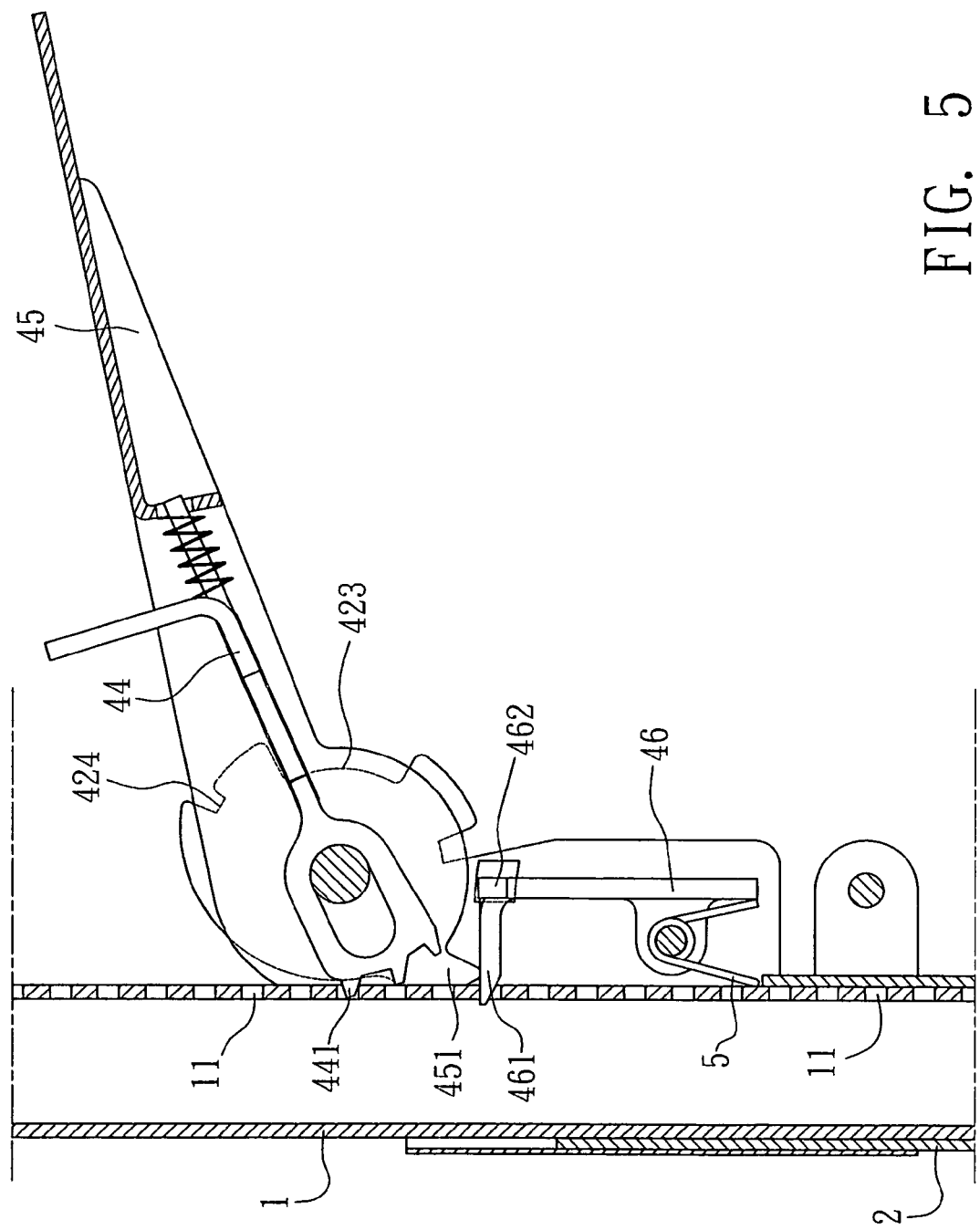
FIG. 5 is a sectional view according to FIG. 2, showing the extension of the inner sleeve of the present invention in a third state.
Figure 6:
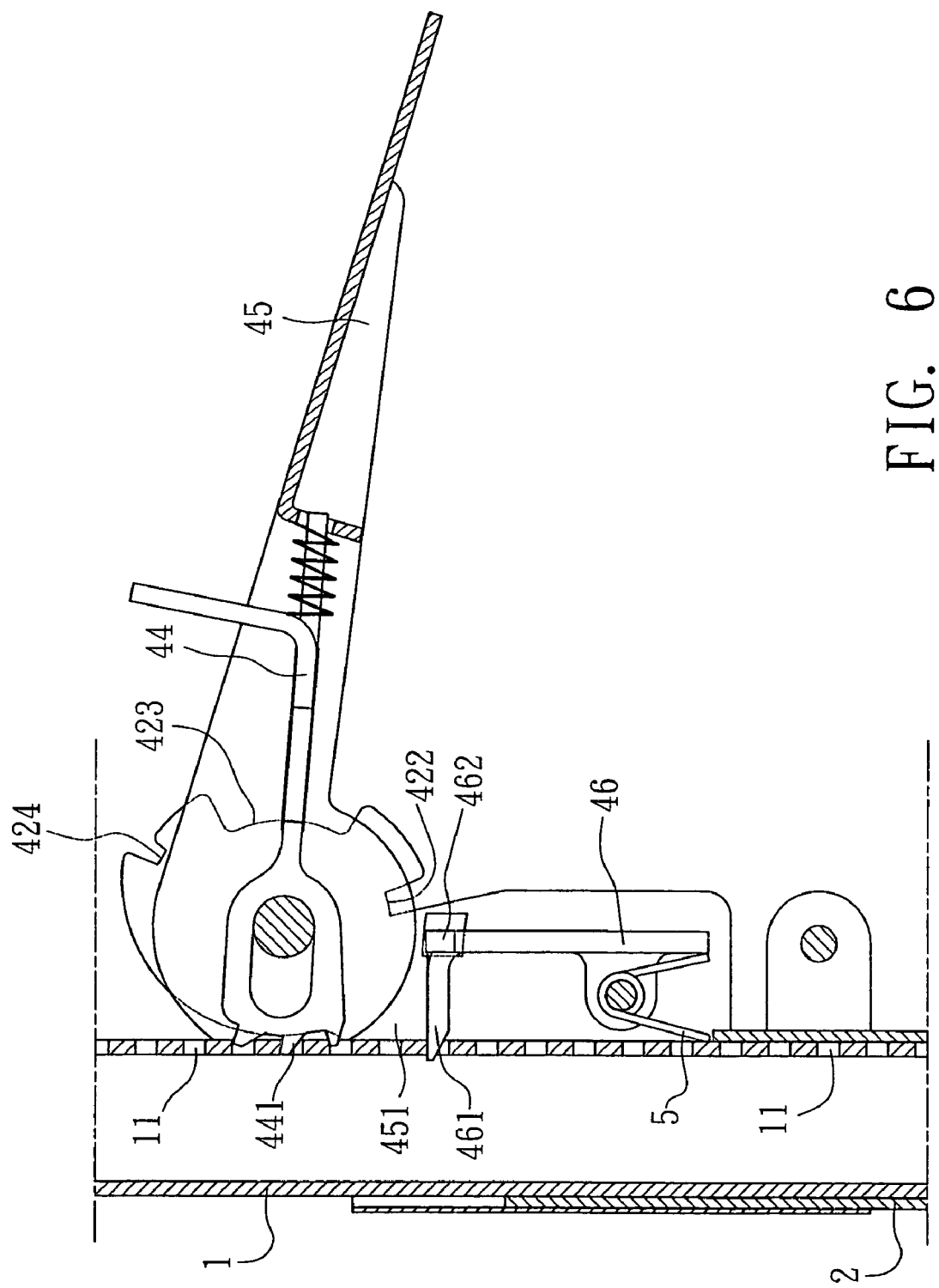
FIG. 6 is a sectional view according to FIG. 2, showing the extension of the inner sleeve of the present invention in a fourth state.

The toothed section 441 has multiple one-way ratchets. When pressing down the handle 45, the ratchets will sequentially push the edges of the engaging holes 11 of the inner sleeve 1 as shown in FIGS. 5 and 6. Accordingly, the extending length of the inner sleeve 1 can be adjusted. During the adjustment of the inner sleeve 1, the pawl 46 disposed in the handle 45 is forced by the torque spring 5, whereby after pushed away by the edges of the engaging holes 11 of the inner sleeve 1, the claw 461 is again engaged in the next engaging hole 11. Therefore, when adjusting the extending length of the inner sleeve 1, the inner sleeve 1 will not retract back. Therefore, the extensible supporting strut of the present invention has a security effect.

Figure 7:
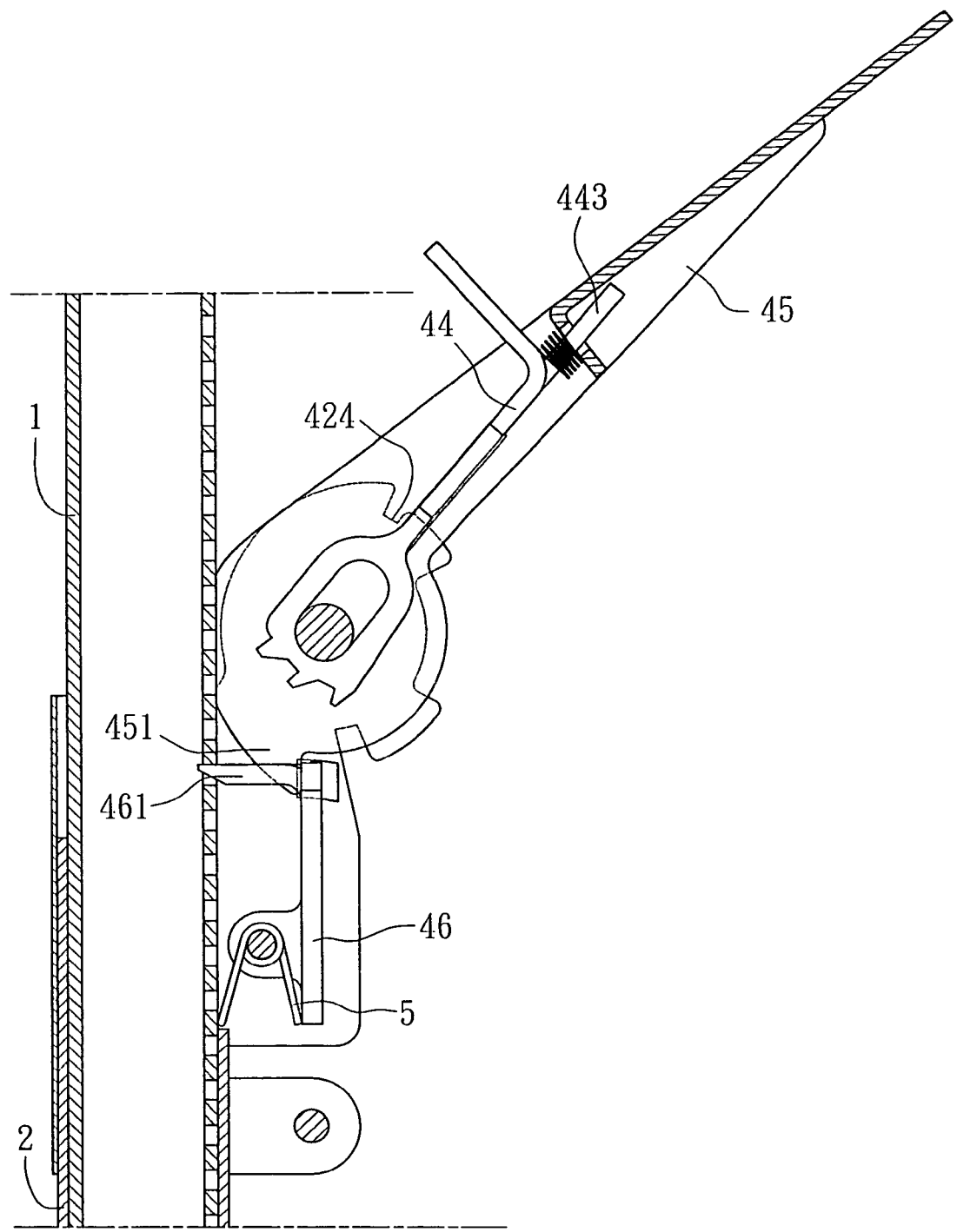
FIG. 7 is a sectional view showing the retraction of the inner sleeve of the present invention in a first state.
Figure 8:
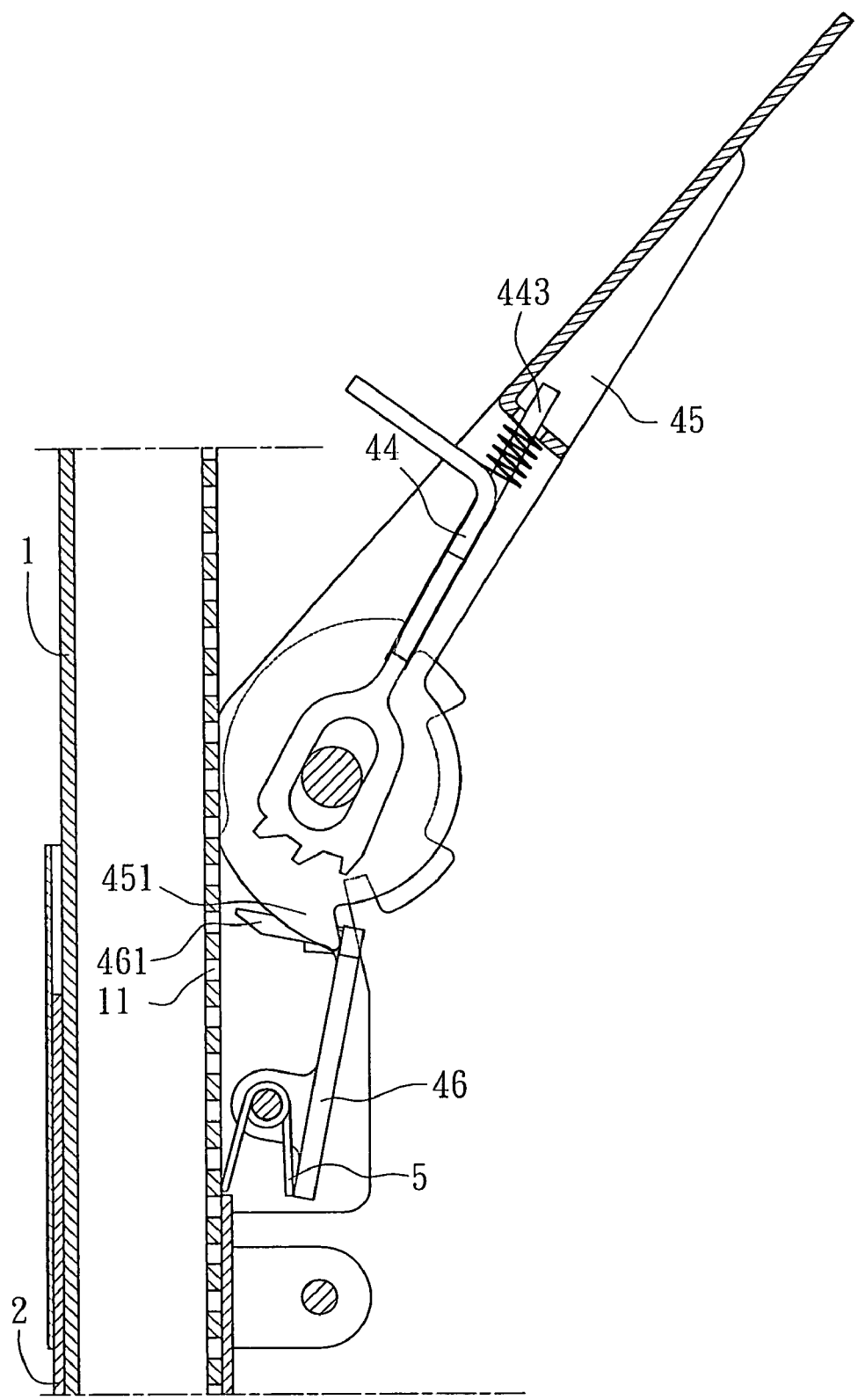
FIG. 8 is a sectional view showing the retraction of the inner sleeve of the present invention in a second state.
Figure 9:
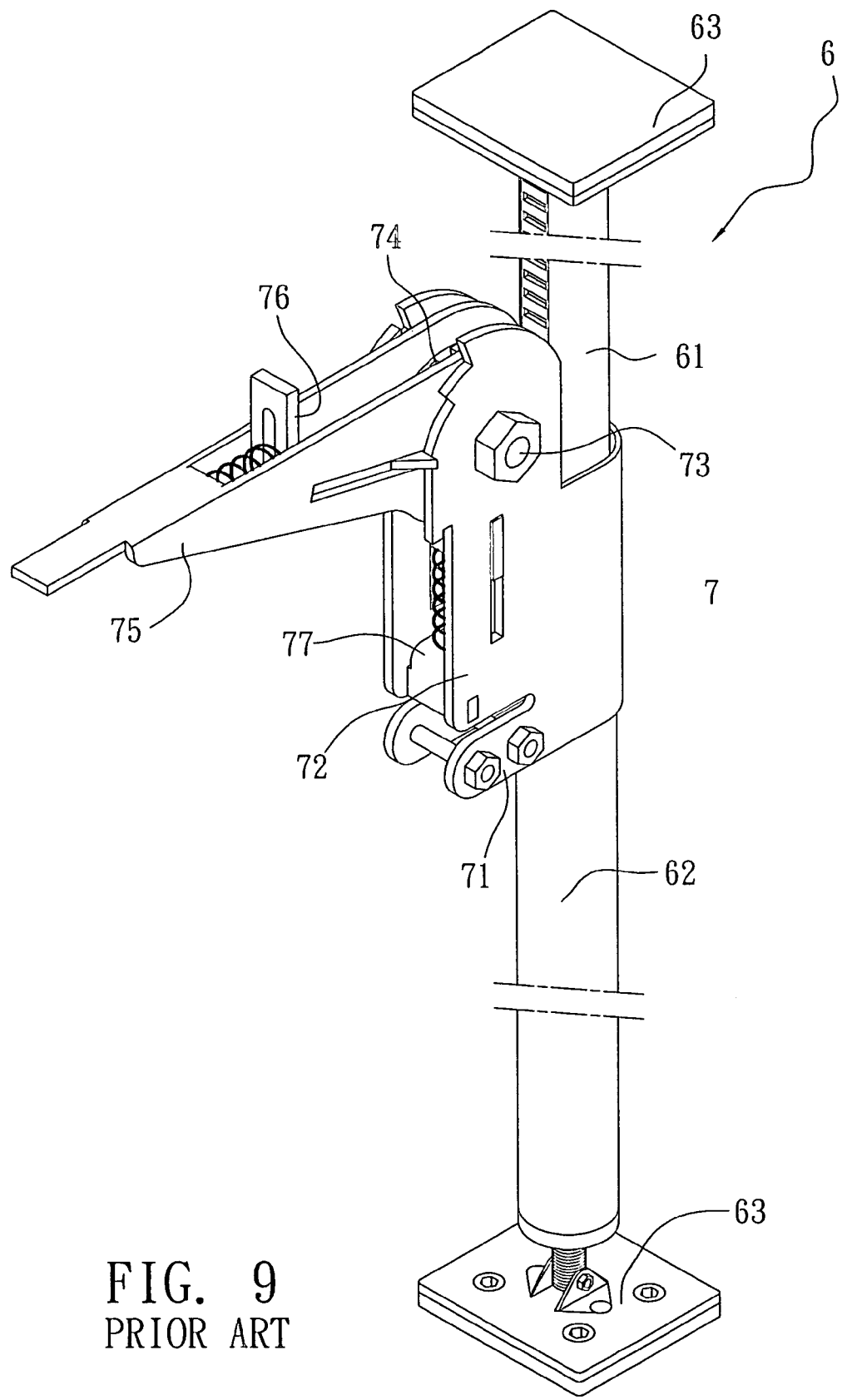
FIG. 9 is a perspective view of a conventional extensible supporting strut.
Figure 10:
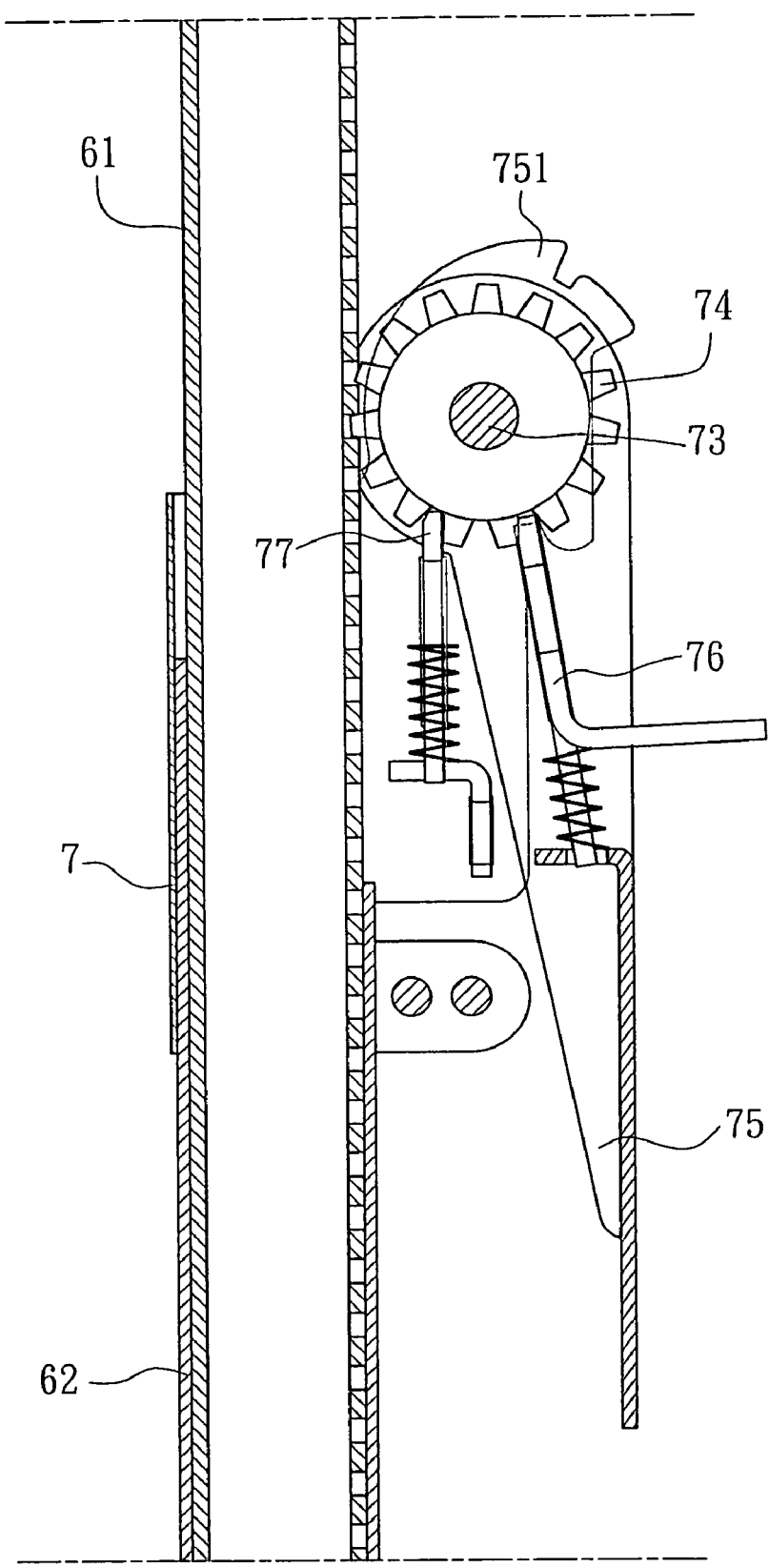
FIG. 10 is a sectional view of the conventional extensible supporting strut.

Referring to FIGS. 7 and 8, when retracting the inner sleeve 1, the engaging member 44 is pushed to extract the chucking section 445 out of the second engaging split 423 of the base seat 4. Then the handle 45 is turned to move the engaging member 44 to the third engaging split 424. At this time, the toothed section 441 of the engaging member 44 is disengaged from the engaging hole 11 of the inner sleeve 1. In addition, the push section 451 of the handle 45 pushes the shoulder sections 462 of the pawl 46, making the claw 461 of the pawl 46 also disengaged out of the engaging hole 11 of the inner sleeve 1. Under such circumstance, the inner sleeve 1 can be quickly retracted. The pawl 46 is pushed by the push section 451 of the handle 45, whereby the rear section of the pawl 46 will press the torque spring 5. Accordingly, the torque spring 5 will more strongly abut against the inner sleeve 1 so that the dropping speed of the upright inner sleeve 1 is slowed down. Therefore, the present invention provides a buffering effect to avoid injury of a user caused by too quick retraction of the inner sleeve 1 of the supporting strut.

The above embodiment is only used to illustrate the present invention, not intended to limit the scope thereof. Many modifications of the above embodiment can be made without departing from the spirit of the present invention.

What is claimed is:

1. An extensible supporting strut comprising an inner sleeve and an outer sleeve, each end of the supporting strut having a supporting section, the inner sleeve being formed with several engaging holes axially arranged at equal intervals, a base seat being connected between the outer sleeve and the inner sleeve, the base seat having two symmetrically extending sideboards each having a head section, an engaging member and a handle being pivotally disposed between the head sections of the sideboards, a pivoted end of the handle being formed with a stepped protruding push section, the engaging member being pivotally disposed in the handle, the engaging member having a pivoted end formed with a toothed section and a slot, a rear section of the engaging member having a protruding abutting section, a spring being fitted on the abutting section for abutting against an inner side of the handle, a middle section of the engaging member having two chucking sections which extend out of the handle, the middle sections of the sideboards being formed with a pair of aligned through holes, a fixing pin being passed through the through holes, a pawl, and a resilient member biasing the pawl, said pawl having a claw, whereby by means of the resilient force of the resilient member, said claw of the pawl is inserted into the engaging hole of the inner sleeve, two sides of the claw being formed with two shoulder sections which can be pushed by the push section of the handle, wherein the head section of each sideboard is sequentially formed with a first engaging split, a second engaging split, and a third engaging split, whereby the chucking section of the engaging member can be selectively chucked in any of the engaging splits.

2. The extensible supporting strut as claimed in claim 1, wherein the resilient member is a torque spring, two ends of the torque spring respectively abutting against rear section of the pawl and the inner sleeve, whereby by means of the resilient force of the torque spring, the claw of the pawl is inserted into the engaging hole of the inner sleeve.

3. The extensible supporting strut as claimed in claim 1, wherein the toothed section has multiple one-way ratchets, whereby when pressing down the handle, the one-way ratchets will sequentially push the edges of the engaging holes of the inner sleeve.

* * * * *